Dec. 8, 1953

W. T. MILLER 2,662,072

PROCESS FOR COPOLYMERIZING $CF_2=CF_2$ WITH $CF_2=CFCl$

Filed June 30, 1948

*INVENTOR.*
WILLIAM T. MILLER
BY
*Roland A Anderson*
*Attorney*

Patented Dec. 8, 1953

2,662,072

UNITED STATES PATENT OFFICE 2,662,072

PROCESS FOR COPOLYMERIZING $CF_2=CF_2$ WITH $CF_2=CFCl$

William T. Miller, Ithaca, N. Y., assignor to the United States of America as represented by the United States Atomic Energy Commission Application June 30, 1948, Serial No. 36,115

3 Claims. (Cl. 260—87.5)

This invention relates to copolymers consisting essentially of carbon and halogen, and more specifically to copolymers of tetrafluoroethylene and trifluoromonochloroethylene, and to a method of making polymeric materials.

Polymers consisting substantially completely of carbon and halogen and containing a high proportion of fluorine, have become of great interest, because of their chemical inertness, in industries in which corrosive substances such as acids, alkalies, the halogens, etc. are used. The very high molecular weight polymers, often called plastics, which have sufficient mechanical strength to be fabricated into durable articles, are of particular interest as a material of construction in such industries.

One object of the invention is to prepare very high molecular weight polymer products consisting essentially of carbon and halogen with a high fluorine content, that have new and useful properties.

Another object is to prepare polymer products of this class that are varied in properties, one from another, so that greater freedom of choice in selecting a material for a given purpose is permitted. A corollary object is to prepare such a range of products which may be used to fabricate articles without the addition of plasticizers.

Another object is to prepare polymer products of this class, of varied properties, that are capable of being molded by conventional molding equipment adapted to operate at temperatures of approximately 300° C.

A further object is to devise an improved method of making certain polymeric products.

Other objects will appear hereinafter.

According to the invention, these objects may be accomplished by preparing very high molecular weight copolymers of tetrafluoroethylene and trifluoromonochloroethylene composed of not more than about 85% by weight tetrafluoroethylene, preferably from about 25% to about 85% tetrafluoroethylene and better from about 30% to about 70% tetrafluoroethylene. The products are composed, for the balance, substantially entirely of trifluoromonochloroethylene. Copolymers that have been made in accordance with the present invention have been found to possess many desirable properties including the following.

As the percentage of tetrafluoroethylene making up the copolymer is increased, the dielectric constant decreases and the electrical loss due to the materials, when placed in a high frequency electric field, decreases so that they are improved as electrical insulating materials, e. g., for coaxial cables.

As the percentage of tetrafluoroethylene increases, the products become more slippery. This property is desirable when the product is to be used to make a sliding bearing, for example, a sealing ring for a rotating shaft or a valve stem packing. The copolymers are softer than polytrifluoromonochloroethylene and harder than polytetrafluoroethylene.

One important practical advantage of the copolymers of this invention over solid polymers of tetrafluoroethylene alone is that the former are capable of being molded by means of conventional molding equipment adapted to operate at temperatures of the order of 300° C., whereas the latter are not. The copolymers of the present invention, above their transition temperatures, exhibit viscous flow and relatively rapid plastic deformation. Apparently, the viscosity of polytetrafluoroethylene is of a higher order of magnitude so that in order to mold it, temperatures of a higher order must be used. It has now been found that the copolymers of trifluoromonochloroethylene and tetrafluoroethylene composed of up to and not more than about 85% tetrafluoroethylene can be easily fabricated.

By judicious selection of the proportions of the constituent monomers, a high degree of control over the properties of the products is attained and products may be made which are adapted to fill specific requirements for particular uses. Moreover, the properties obtained belong to the copolymers per se. In comparison, in order to vary the properties of polymers of trifluoromonochloroethylene, plasticizers may be added. The useful plasticizers are volatile and there is an advantage in obtaining products of the desired characteristics, which characteristics are intrinsic and permanent. Polymers of tetrafluoroethylene are not readily plasticized.

It has been found that when a mixture of tetrafluoroethylene and trifluoromonochloroethylene is polymerized, the percentage conversion of the latter is increased over the value when it is polymerized by itself. It appears that, in general, the characteristics of the copolymers are intermediate between those of the polymers of each species of olefin. This is not to be expected, inasmuch as in the case of copolymers of other olefins, "peak" characteristics are known, that is, the copolymers have characteristics which are not possessed by the polymers of either olefin species. It has been found that when it is desired to produce a material having substantially the characteristics of polytrifluoromonochloroethylene, it is advantageous to polymerize a mixture comprising trifluoromonochloroethylene and tetrafluoroethylene containing up to 15%, and preferably 10% to 15% tetrafluoroethylene based on the total weight of the monomers. The use of the latter results in increased conversion of trifluoromonochloroethylene, and when a relatively small percentage is used, copolymers may be produced which do not differ greatly in properties from polytrifluoromonochloroethylene.

In the following description reference will be made to one property of the polymeric products, namely the "no strength temperature" (abbreviated N. S. T.), that is, the temperature at which under specific conditions all strength properties of the material are lost.

The following method and apparatus were used to measure the N. S. T. and in this connection reference will be made to the attached drawings, in which:

Figure 1 is an elevation of a N. S. T. measuring apparatus with the heating unit in vertical section.

Figure 1:
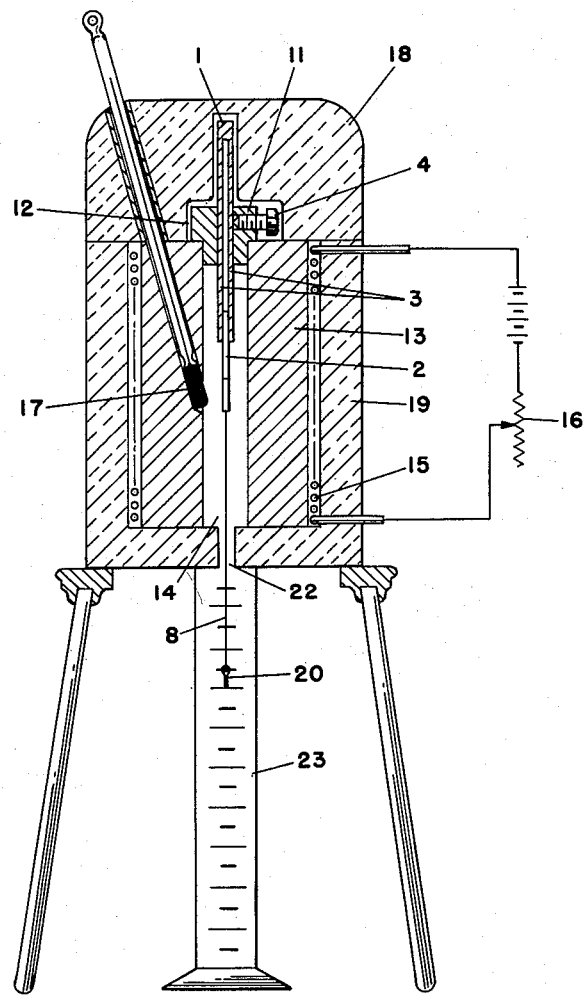
Figure 2:
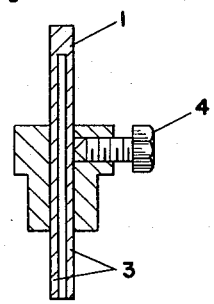
Figure 2 is a detail view of a test sample of the polymeric material and sample clamp, the clamp being partly shown in axial section.

As shown in Figures 1 and 2 the sample 2 is clamped between the jaws 3 of the clamp 1 by tightening the set screw 4. The clamp 1 is an extension of the plug 11 which is inserted into the bore 14 of the tube 13. The plug 11 serves to center the sample 2 in the bore 14 of the tube 13 and the flange 12 limits the extent to which the plug may be inserted in the bore. The tube 13 is heated by electrical heating element 15. The temperature of the heating element is controlled by a resistance 16. The temperature of the block is measured by a thermometer 21 in the thermometer well 17. The apparatus is thermally insulated by the insulating members 18 and 19 and member 18 can be removed to give access to the plug 11. A weight 20 is attached to sample 2 by a free hanging wire 8 which passes through the insulation 19 at hole 22. A scale 23 serves to indicate the movement of the weight 20.

The test is performed by clamping a sample of specified dimensions of the polymeric material into the clamp as shown in Figure 2, placing it in the heater in the position shown in Figure 1, and heating it slowly until it breaks. The dimensions of each sample must be reproduced to careful specifications.

Figure 3:
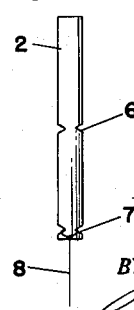
Figure 3 is a detail view of the test sample.

A sample of the polymeric material is hot pressed into a $\frac{1}{16}$" thick sheet, cut into a strip $\frac{1}{8}$" by $\frac{1}{16}$" by 2" and notched as indicated in Figures 2 and 3 to a thickness of $\frac{3}{64}$" by $\frac{1}{16}$" at notch 6. The sample 2 is notched at the center 6 to insure its breaking at this point. A fine wire 8 and weight 20 are attached to the lower end at the notch 7 so that the total weight from the notch 6 down is 0.5 gram. The temperature of the sample is increased at the rate of about 1.5° C. per minute as the breaking temperature is approached by slowly increasing the potential across the heating element 15. Differences in N. S. T. of 5° C. up to about 325° C. are considered significant. All N. S. T. values hereinafter referred to were determined on a sample of the same dimensions in a similar apparatus. N. S. T. values are found to be independent of the previous heat treatment of the sample, so long as extreme temperature conditions which produce thermal cracking are avoided.

The preferred method of making the products of the present invention comprises copolymerizing tetrafluoroethylene and trifluoromonochloroethylene in suitable proportions in the presence of a halogen-substituted acetyl peroxide, preferably a completely halogen-substituted acetyl peroxide, e. g., trichloroacetyl peroxide, as a polymerization promoter. These peroxides decompose at relatively low temperatures (the latter is particularly effective at a temperature in the range of −20° C. to 0° C.) and by means of such low temperature polymerization processes, polymeric materials of very high molecular weight may be produced.

The following examples illustrate the present invention:

EXAMPLE 1

An evacuated thick walled Pyrex bomb was charged with a solution formed by adding to trifluoromonochloroethylene ($CF_2$=$CFCl$), trichloroacetyl peroxide ($[CCl_3CO_2]_2$) in tricholorofluoromethane ($CFCl_3$). The bomb was cooled to a temperature of −120° C. to −130° C. and tetrafluoroethylene ($CF_2$=$CF_2$) was distilled into it. The materials contained in the bomb were frozen, the bomb pumped to empty it of gas, the materials melted, refrozen and the bomb again pumped and sealed. The bomb contents thus consisted of the following:

| Reactants | Weight (gs.) |
|---|---|
| $CF_2$=$CF_2$ | 67.5 |
| $CF_2$=$CFCl$ | 25.4 |
| $CFCl_3$ | 5.6 |
| $(CCl_3CO_2)_2$ | 0.2 |

The bomb was then warmed to −17° C. and maintained at this temperature for 185 hours. At the end of this time it was opened permitting the escape of any volatile material present, and heated to a temperature of about 130° C. to complete the removal of volatile material. A solid copolymer of trifluoromonochloroethylene and tetrafluoroethylene weighing 90.7 gs., having a N. S. T. of 346° C., was obtained. The copolymer was composed of about 74% by weight of tetrafluoroethylene and was still capable of being hot pressed into sheets.

EXAMPLE 2

Two runs were carried out in order to determine the effect, on the polymerization behavior of trifluoromonochloroethylene, of the presence of a relatively small percentage of tetrafluoroethylene. The bombs were charged in substantially the same manner as described in Example 1 and polymerization was effected by maintaining each of them at −17° C. for 184 hours. The quantities of the reactants used and of the products obtained were as follows:

| Reactants | Bomb No. 1 Weight (gs.) | Bomb No. 2 Weight (gs.) |
|---|---|---|
| $CF_2$=$CF_2$ | 0.0 | 5.2 |
| $CF_2$=$CFCl$ | 49.9 | 43.9 |
| $CFCl_3$ | 2.2 | 1.9 |
| $(CCl_3CO_2)_2$ | 0.115 | 0.102 |
| Products | 21.8 | 35.3 |

Thus, the percentage conversion of trifluoromonochloroethylene for bomb No. 1 was 43.6%. The overall conversion for bomb No. 2 was 71.8%; the percentage conversion of trifluoromonochloroethylene was at least 68.5% for bomb No. 2.

This experiment illustrates the fact that by copolymerizing trifluoromonochloroethylene and a relatively small percentage of tetrafluoroethylene, a substantially increased conversion of trifluoromonochloroethylene to polymeric material results, as compared with polymerizing it in the absence of tetrafluoroethylene. The copolymers so prepared do not differ markedly in properties from polytrifluoromonochloroethylene and may be used for the same purposes as the latter.

A number of copolymers of various compositions were prepared under various conditions. In Table I, below, there is shown the variation in hardness with variation in the percentage of trifluoromonochloroethylene in the polymeric material. Hardness is expressed in Vickers hardness numbers and measurements were made with an Eberbach Microhardness Tester manufactured by Eberbach and Sons Co., Ann Arbor, Michigan. Solvent swelling indicates the relative resistance to the swelling action of solvents and is the percentage increase in weight of a sample having a ratio of square centimeters of surface to cubic centimeters of volume of about 15½, after immersion in the vapor of refluxing trichloroethylene for 72 hours.

*Table I*

| Material | $(CF_2=CFCl)_n$ | $C_A$ | $C_B$ | $C_C$ | $C_D$ | $(CF_2=CF_2)_n$ |
|---|---|---|---|---|---|---|
| Wt. percent $CF_2=CFCl$ in material | 100 | 85 | 64 | 53 | 26 | 0 |
| Vickers Hardness No | 6.8 | 5.7 | 4.7 | 3.8 | 3.2 | (¹) |
| Solvent Swelling | 18.6 | 12.8 | 5.0 | 4.5 | 2.7 | 1–2 |
| N. S. T | 308 | 315 | 246 | 293 | 346 | |
| First Order Transition Temperature, Degrees C | 208 | 212 | 215 | 225 | 277 | 327 |

¹ Too soft to measure.

The N. S. T., also given in the above table, depends both on the composition of the copolymer and on its molecular weight. Thus, the N. S. T. of a copolymer of given composition increases with increasing molecular weight.

The copolymers of the present invention are plastics in the sense that they possess substantial mechanical strength and can be manufactured into durable articles. The most preferred copolymers of the invention are those which are composed of 25% to 85% tetrafluoroethylene and better 30% to 70% tetrafluoroethylene and have a N. S. T. in the range of 215° C. to 350° C. and better 250° C. to 300° C.

The copolymers of this invention exhibit the property common to many long chain linear polymers of orientability. They may be cold drawn and may be formed into fibers.

Since many embodiments might be made of the present invention and since many changes might be made in the embodiment described, it is to be understood that the foregoing description is to be interpreted as illustrative only and not in a limiting sense.

I claim:

1. The method which comprises copolymerizing tetrafluoroethylene and trifluoromonochloroethylene in the presence of trichloroacetyl peroxide as a polymerization promoter at a temperature in the range of —20° C. to 0° C. to produce a plastic copolymer composed of about 25% to about 85% by weight of tetrafluoroethylene and composed for the balance substantially entirely of trifluoromonochloroethylene.

2. The method for making a copolymer of high molecular weight and of good physical and molding properties which comprises copolymerizing tetrafluoroethylene and trifluoromonochloroethylene in the presence of trichloroacetyl peroxide as a polymerization promoter at a temperature of about —17° C. to produce a plastic copolymer composed of about 25 per cent to about 85 per cent by weight of tetrafluoroethylene and composed for the balance substantially entirely of trifluoromonochloroethylene.

3. The method which comprises copolymerizing trifluorochloroethylene and tetrafluoroethylene in the presence of trichloroacetyl peroxide as a polymerization promoter at a temperature sufficiently low such that the promoter is effective to produce a plastic copolymer composed of about 25 to about 85 per cent by weight of tetrafluoroethylene and composed for the balance substantially entirely of trifluorochloroethylene.

WILLIAM T. MILLER.

References Cited in the file of this patent

UNITED STATES PATENTS

| Number | Name | Date |
|---|---|---|
| 2,393,967 | Brubaker | Feb. 5, 1946 |
| 2,456,255 | Coffman et al. | Dec. 14, 1948 |
| 2,462,042 | Howald et al. | Feb. 15, 1949 |
| 2,531,134 | Kropa | Nov. 21, 1950 |

FOREIGN PATENTS

| Number | Country | Date |
|---|---|---|
| 583,482 | Great Britain | Dec. 19, 1946 |
| 593,605 | Great Britain | Oct. 21, 1947 |
| 796,026 | France | Mar. 27, 1936 |